Aug. 16, 1960   G. H. BINGHAM, JR   2,949,410
METHOD OF MAKING A HOLLOW MOLD
Filed Feb. 20, 1958

Inventor
George H. Bingham, Jr.
by Roberts Cushman & Grover
Attys

United States Patent Office 2,949,410
Patented Aug. 16, 1960

2,949,410

METHOD OF MAKING A HOLLOW MOLD

George H. Bingham, Jr., Westminster, Md., assignor to Cambridge Rubber Company, Taneytown, Md., a corporation of Maryland Filed Feb. 20, 1958, Ser. No. 716,371

1 Claim. (Cl. 204—9)

This invention pertains to a novel method of making molds for use in the manufacture of waterproof articles, wherein the waterproofing material is a synthetic plastic, and relates more especially to a method whereby a mold of accurate shape and dimensions may be produced.

In the manufacture of plastic footwear—for example, but without limitation, boots, it has been proposed to prepare a hollow mold by first building up, upon a conventional boot last of the desired size and shape, a model boot which, after curing, is removed from the last and electroplated by a well-known procedure, thus providing a metallic shell from whose interior the model boot is removed, and which then constitutes a hollow mold whose interior is an exact replica (but in reverse) of the external surface of the model boot. This shell or mold is then employed in the manufacture of plastic boots for example, by the so-called "slush molding" process.

Since the wall of the mold (that is to say, the metallic shell resulting from the electroplating operation) is desirably thin, so as to facilitate the curing of the boot which is molded therein (a wall thickness of the order of $\frac{1}{32}$ of an inch being customary) and since the model boot must be withdrawn from the shell without danger of deforming the latter, the model boot must be of a material such that it may readily be deformed in response to the application of a force insufficient to bend the shell. For example, the model boot may be made of textile fabric frictioned with rubber. When this easily deformable model boot is suspended in the electroplating bath, it must be weighted to prevent it from floating, for instance by filling it with water, but because of its inherent flexibility, the internal weight tends to stretch it and cause it to sag—one common result being that its sole bulges downwardly. Under such conditions, the shell, which is produced by the electroplating operation, is not an accurate replica of the model boot (as the latter was formed on the last) and when a plastic boot is made by the use of this mold, the sole of the boot is downwardly convex instead of being substantially flat as it should be.

The principal object of the present invention is to provide a method whereby a mold, made by electroplating a flexible model boot, may be made to have the accuracy of shape and dimensions of the model boot as the latter was made on the last. Other and further objects and advantages of the invention will be pointed out in the following detailed description and by reference to the accompanying drawings wherein.

Figures 3, 4:
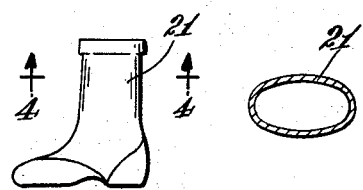
Fig. 3 is a diagrammatic side elevation showing the model boot of Fig. 2 removed from the last.
Fig. 4 is a transverse section on the line 4—4 of Fig. 3.

Referring to the drawings, the numeral 20 designates a last which may be a conventional metal last, such as is used in the preparation of rubber footwear, the last 20 being of that size and style which would be employed in making a rubber boot of the style and size of the plastic boot which it is intended to manufacture. Having provided this last, there is then built up on this last, for example by dipping or other usual rubber footwear procedure, a model boot 21, whose wall is of textile material frictioned with rubber and sufficiently thin to insure the desired flexibility. Having built up this model boot on the last 20, the assembly is subjected to a vulcanizing operation, such as completely to cure the model boot 21, whereupon the latter is stripped from the last and turned right-side-out, if necessary, so that the resultant model boot appears as shown in Figs. 3 and 4.

Figure 5:
Fig. 5 is a diagrammatic side elevation of a last of the same style as that of Fig. 1, but of a size smaller than the last of Fig. 1.
Figure 6:
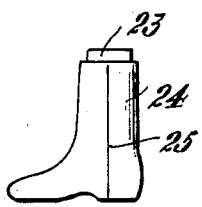
Fig. 6 is a diagrammatic side elevation showing a hollow form or support as made on the last of Fig. 5.
Figure 7:
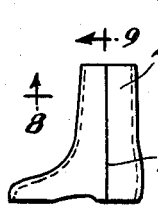
Fig. 7 is a diagrammatic side elevation of the form or support of Fig. 6, removed from the last.
Figures 8, 9:
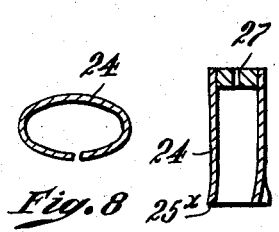
Fig. 8 is a diagrammatic transverse section on the line 8—8 of Fig. 7.
Fig. 9 is a vertical transverse section of the line 9—9 of Fig. 7 and showing a plug filling the top of the form.
Figure 19:
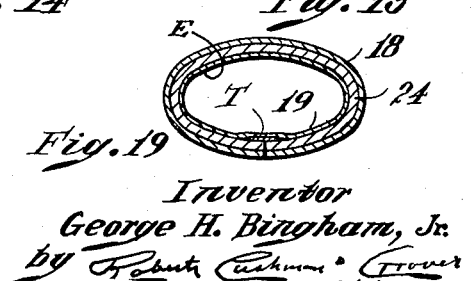

Another last 23 (Fig. 5) is now selected, which if the form to be made thereon is initially to have a thick wall, may be a size smaller than last 20, otherwise it may be of the same size and style as the last 20 (or the latter may be used if desired) and upon this last, there is built up a hollow form or support 24 (Fig. 6) in the same general way as the model boot, if desired. This form or support is then desirably coated or sprayed on its exterior surface with any suitable stiffening material which sets and forms a hard crust; for example, the material employed for this purpose may be ordinary shellac. When this coating has hardened, its surface is smoothed as, for example, by sandpapering. In building up this form upon the last, it may be made to include a sole or other bottom portion or not, as desired. This form 24 is slit downwardly from its top along one side, as shown at 25, and removed from the last, the resultant form being shown in Fig. 7. This slit 25 need not, in all cases, extend down to the lower edge of the form, since the lower part of the form may usually be separated and withdrawn from the model boot even though the slit extend only part-way down, for example, to its ankle portion. Before removal from the last, this form is desirably trimmed so that its lower edge 25ˣ (Fig. 9) is flush with the bottom of the last on which it was made. After removing the form from the last, the slit in its side may be closed temporarily, for example by an adhesive tape T (Fig. 19), and the interior of the form electroplated to provide a thin, waterproof interior metallic shell E (Fig. 19). Such an interior shell is advantageous in preventing the form from becoming saturated with water during subsequent operations. If desired, the form, as built up on the last, may be removed therefrom without applying the aforesaid external stiffening coating, and the interior electroplated to form the internal shell as above described, said shell, in this event, being relied upon to impart the desired stiffness to the form. After this shell E has been formed, it will ordinarily be slit downwardly in registry with the slit 25.

A form made, as just described and comprising a stiff inner metallic shell, may, if it include a bottom as well as an upper portion, be employed as a last. A last so made is much cheaper than a last made by customary methods and is very light in weight and thus easy to handle during boot-manufacturing operations.

Since this form is open at top and bottom and is slit downwardly along its side as at 25, it may be partially collapsed so that the margins at opposite sides of the slit 25 may be overlapped, thus reducing the transverse dimensions of the form; however, its natural resiliency tends to expand it to the dimensions which it had when formed on the last. Desirably, before using this form, an annular plug 27 (Fig. 9) of rigid material, for example wood, is inserted and removably secured in the open top of the form, the plug being of a size and shape such as to keep the upper end of the form fully distended. This plug has a hole for the admission of water, and may be provided with a hook for use in suspending the form in the electroplating bath.

Figure 10:
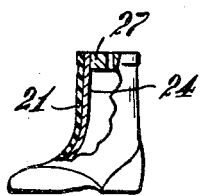
Fig. 10 is a diagrammatic side elevation, partly broken away, showing the form of Fig. 7 disposed within the model boot of Fig. 2.
Figure 11:
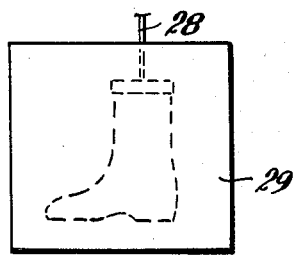
Fig. 11 is a diagrammatic elevation showing the assembly of Fig. 10 suspended in an electroplating tank.
Figure 12:
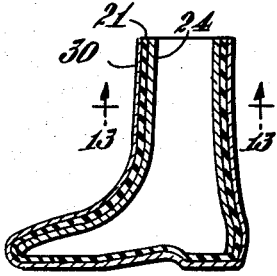
Fig. 12 is a vertical front-to-rear section illustrative of the results of the electroplating operation.
Figure 13:
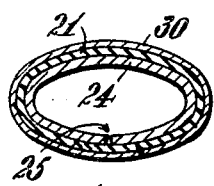
Fig. 13 is a transverse section on the line 13—13 of Fig. 12, showing the metallic shell resulting from the electroplating, with the model boot inside the shell and the form or support inside of the model boot.
Figure 14:
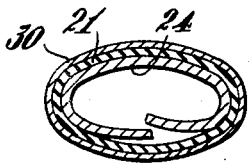
Fig. 14 is a view similar to Fig. 13, but illustrating the step of collapsing the form preparatory to removing it from the model boot.
Figure 15:
Fig. 15 is a similar transverse section illustrative of the step of collapsing the model boot, preparatory to removing it from the metallic shell or mold.

Preparatory to the electroplating operation, this form 24, with the plug 27 removed, is partially collapsed and disposed within the model boot 21, as illustrated in Fig. 10, the resiliency of the form causing it to resume its normal shape, the plug 27 then being put in place. As above described, form 24 may or may not have a sole portion, but in either event, it is coextensive with and contacts the model boot upper at all points. When thus installed within the model boot, the form holds the latter fully distended and prevents it from collapsing or sagging. This assembly is then suspended within the electroplating tank 29, as shown in Fig. 11, by means of the suspension element 28 which is attached to the plug 27 in the upper end of the form 24. With such an arrangement, the form 24 supports the entire weight of the model boot and such weighting material as may be placed within the model boot. A deposit of any desired metal is now plated, by any customary procedure onto the exterior of the model boot, the latter having first been coated with a suitable film of conducting material, for instance a conventional graphite preparation, the plating operation being continued until a metallic shell 30 (Fig. 12) of the desired thickness (for example 1/32 of an inch as above suggested) has been built up on the exterior of the model boot 21. It will be evident that by this operation, the interior of the shell will have a contour which is an exact replica of the external contour of the model boot 21 except that it will be in reverse. When the metallic shell has been built up to the desired thickness, the assembly is taken from the plating tank, the plug 27 is removed from the top of the former 24 and the latter is partially collapsed (as shown in Fig. 14) by overlapping its margins at opposite sides of the slit 25 so that it may be separated from the model boot 21. The former may now be withdrawn from the interior of the rubber model. The rubber model may now be twisted or collapsed (as illustrated in Fig. 15) to separate its outer surface from the inner surface of the metal shell and is then withdrawn from the metallic shell 30 without requiring the application of force sufficient to deform or damage the shell. The resultant mold, consisting of the metallic shell 30, is now ready for use in the molding of boots, each an exact replica of the model boot 21.

While the above mode of preparing the form or support 24 for the rubber model is desirable, it is contemplated that the form may be made in other ways, for example, the last employed in making the form may be smoothly covered with cotton stockinet and then coated or dipped with a stiffening plastic of any well-known kind. After this coating has been cured, the stockinet is stripped from the last and then slit down one side, as above described, if it be too stiff to permit it to be collapsed without so slitting it. If, when the form has been stripped from the last, it is not stiff enough, it may be sprayed or coated in its interior with any suitable stiffening agent, for example shellac, or electroplated internally by any known procedure as above suggested, thereby to increase its wall thickness and stiffness.

Forms made as above suggested may, if desired, be employed as displays for boots made on lasts like that used in making the forms or as lasts for use in making boots.

While, according to the above method, the mold is of metal, made by electrolytic deposit on the rubber model, it is contemplated, as within the broader scope of the invention, to make the mold by coating or dipping the rubber model, while held fully distended by the interior form, so as to deposit a layer of plastic material of any suitable type on the exterior of the rubber model which, when cured, forms a hard and stiff shell. Such a shell, after the form and rubber model have been removed, may serve for molding boots of a plastic material which requires only a low heat and a short period of curing.

While as above illustrated and described, the molded boot, as made, is of conventional type and like one which is built up on a last of ordinary construction, it is contemplated that the last on which the model is made may be of the type disclosed in the co-pending application of George H. Bingham, Jr., Serial No. 713,433, filed February 5, 1958. The last therein described is shaped to provide certain areas which impart to the resultant boot top a contour such as to facilitate the attachment, by adhesive means, of a textile tape or tapes to the interior surface of the upper, for example to facilitate the attachment of the tapes of a slide fastener.

Figure 16:
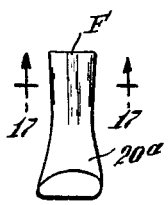
Fig. 16 is a front elevation of a last, which may be used instead of the last of Fig. 1, in making the model boot.
Figure 17:
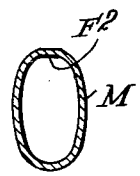
Fig. 17 is a transverse section through a mold resultant from the use of the last of Fig. 18.

Thus, as shown in Fig. 16, the last 20ᵃ has, at its front, a surface F which is of uniform width from end-to-end and of uniform contour at any horizontal section, for example rectilinear in horizontal section, and of a width substantially equal to the total width of a slide fastener. The result of using such a last in making the model boot is that the mold made from said model boot is like the mold M (Fig. 17) having the interior surface F² substantially like the surface F of the last 20ᵃ, but in reverse.

Figure 1:
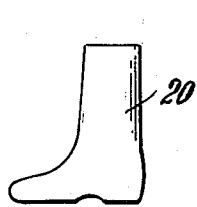
Fig. 1 is a diagrammatic side elevation of a last of a size and style appropriate for use in making a boot of the desired type.
Figure 2:
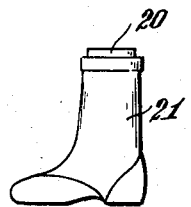
Fig. 2 is a diagrammatic side elevation showing a model boot as made on the last shown in Fig. 1.
Figure 18:
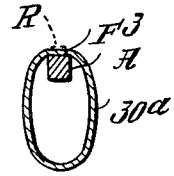
Fig. 18 is a diagrammatic transverse section showing a mold, initially made by the use of a last like that of Fig. 1, but which has been reshaped, by hammering, to a configuration like the mold of Fig. 17; and, Fig. 19 is a transverse section illustrating the form of another construction.

A mold having a similar interior surface may be made by taking a mold, prepared as above, by the use of the last 20 of Fig. 1, and after the model boot has been withdrawn from the mold, placing the latter (as shown at 30ᵃ Fig. 18) on an anvil A having an elongate face F³ of the desired contour, and hammering the mold, for example with a rubber hammer, to conform the convex front portion R of the mold (as indicated in dotted lines) to the shape of said face of the anvil.

Having prepared a hollow mold or container, as above described, it is desirable to prepare, what is conveniently called a "prototype" boot, by the use of said mold, and to place the prototype in storage, to form a sample or standard, so that if the mold be injured, destroyed, or discarded, exact replicas of the mold can be prepared at any time by the use of the prototype.

While certain procedures have been described as embodied in the present invention, it is to be understood that the invention is broadly inclusive of any and all modifications falling within the scope of the appended claim.

I claim:

For making a unitary, seamless, hollow mold having walls of minimum thickness consistent with use of the mold in forming a boot by the slush molding process, that method which includes the steps of providing a flexible model boot, coating the boot with a film of conductive material, weighting the boot, with a material adapted to be poured into and from the boot, for submerging the boot in an electroplating bath, electroplating the boot for forming the mold, and removing the boot from the mold; in further combination with the intermediate steps of providing a hollow supporting form of stiffly resilient material having a normal size and shape corresponding to the inner surface of the boot, said form being adapted to be collapsed for inserting and withdrawing the form from the boot, inserting the stiffly resilient hollow form within the boot, prior to the weighting of the boot, the inserted form tending to expand so as to contact the inner surface of the boot upper at all points and thereby holding the boot fully distended and without distortion while the boot is submerged in the electroplating bath, and collapsing and withdrawing the form as a unit from the boot prior to removal of the boot from the mold.

References Cited in the file of this patent

UNITED STATES PATENTS

| | | |
|---|---|---|
| 1,151,318 | Wood | Aug. 24, 1915 |
| 1,426,549 | Corey | Aug. 22, 1922 |
| 1,958,072 | Sebrell | May 8, 1934 |
| 1,986,637 | L'Hollier | Jan. 1, 1935 |
| 2,074,335 | Kelley | Mar. 23, 1937 |
| 2,217,164 | Gongolsky | Oct. 8, 1940 |
| 2,275,582 | Bull | Mar. 10, 1942 |
| 2,287,122 | Norris | June 23, 1943 |
| 2,327,762 | Bull | Aug. 24, 1943 |
| 2,538,160 | Milton et al. | Jan. 16, 1951 |
| 2,637,689 | Myers | May 5, 1953 |